(12) United States Patent
Verthein et al.

(10) Patent No.: US 8,830,188 B2
(45) Date of Patent: Sep. 9, 2014

(54) INFRASTRUCTURAL HAPTICS ON WALL SCALE INTERACTIVE DISPLAYS

(75) Inventors: William Verthein, Bellevue, WA (US); Josh Watson, Seattle, WA (US); Stephen Lee, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 269 days.

(21) Appl. No.: 13/165,270

(22) Filed: Jun. 21, 2011

(65) Prior Publication Data

US 2012/0326989 A1 Dec. 27, 2012

(51) Int. Cl.
*G06F 3/0488* (2013.01)
*G06F 3/041* (2006.01)
*G06F 3/01* (2006.01)

(52) U.S. Cl.
CPC ............... *G06F 3/041* (2013.01); *G06F 3/016* (2013.01)
USPC ........... 345/173; 345/174; 345/175; 345/158; 345/1.1; 345/1.3; 340/407.1; 340/407.2; 341/22; 341/27; 341/33; 715/702

(58) Field of Classification Search
USPC ......... 345/173, 156, 158, 181, 424, 420, 179, 345/174, 175; 348/46; 340/407.1, 407.2; 341/20, 22, 27, 33; 715/702
See application file for complete search history.

(56) References Cited

U.S. PATENT DOCUMENTS

| 7,755,607 | B2 | 7/2010 | Poupyrev et al. | |
|---|---|---|---|---|
| 2002/0109668 | A1 | 8/2002 | Rosenberg et al. | |
| 2004/0046736 | A1* | 3/2004 | Pryor et al. | 345/156 |
| 2005/0222830 | A1 | 10/2005 | Massie et al. | |
| 2005/0275942 | A1 | 12/2005 | Hartkop et al. | |
| 2006/0256075 | A1 | 11/2006 | Anastas et al. | |
| 2007/0146316 | A1* | 6/2007 | Poupyrev et al. | 345/156 |
| 2008/0300055 | A1* | 12/2008 | Lutnick et al. | 463/39 |
| 2008/0303782 | A1* | 12/2008 | Grant et al. | 345/156 |
| 2011/0018697 | A1 | 1/2011 | Birnbaum | |
| 2011/0128250 | A1* | 6/2011 | Murphy et al. | 345/174 |

OTHER PUBLICATIONS

Lee, et al., "Haptic Pen: Tactile Feedback Stylus for Touch Screens", Retrieved at <<http://www.merl.com/papers/docs/TR2004-133.pdf>>, Proceedings of the 17th annual ACM symposium on User interface software and technology, Oct. 2004, pp. 6.
Poupyrev, et al., "TouchEngine: A Tactile Display for Handheld Devices", Retrieved at <<http://www.hapi-project.com/files/p644-ivan.pdf>>, Proceeding of '02 extended abstracts on Human factors in computing systems, Apr. 20-25, 2002, pp. 644-645.

* cited by examiner

*Primary Examiner* — Olga Merkoulova
(74) *Attorney, Agent, or Firm* — Andrew Smith; Jim Ross; Micky Minhas

(57) ABSTRACT

An interactive wall provides tactile feedback based on detected touch and displayed content on the wall surface. Upon detecting a touch on the wall surface, the interactive wall provides real time tactile feedback corresponding to the touch employing one or more actuators. The interactive wall itself may serve as projection surface for the display or a wall-size display be affixed to the wall trans-conducting tactile feedback to the user.

19 Claims, 7 Drawing Sheets

INFRASTRUCTURAL HAPTICS ON WALL SCALE INTERACTIVE DISPLAYS

BACKGROUND

Touch sensitive display technologies are ever prevalent in modern devices. A variety of devices ranging from hand held mobile devices to large LCD displays incorporate touch sensitive layers to enable the user to interact with displayed content directly. Touch sensory integration in displays eliminate the need for additional devices to control the displayed content. In addition, touch sensory input may enable a heightened level of user interaction with displayed content by enabling additional levels of control such as multi-gesture input, two handed input, multiple user input, etc.

A majority of legacy touch sensitive displays do not provide tactile feedback. Lacking a feedback, a user is unable to sense an interaction with the displayed content. Those devices with tactile feedback capabilities usually implement such features in limited fashion. Devices with tactile feedback functions are usually limited to small display sizes and mostly implement vibration based technologies. Limited deployment of tactile feedback technologies take away from a more immersive user experience while interacting with displayed content.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing infrastructural haptics on wall scale interactive displays. An interactive wall may be enabled to detect a touch on a wall surface through sensors of the interactive display. Upon detecting a touch event such as a click, a button press, a dragging motion, or comparable action, the interactive wall may provide a tactile feedback corresponding to the detected touch through actuators integrated into the wall.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
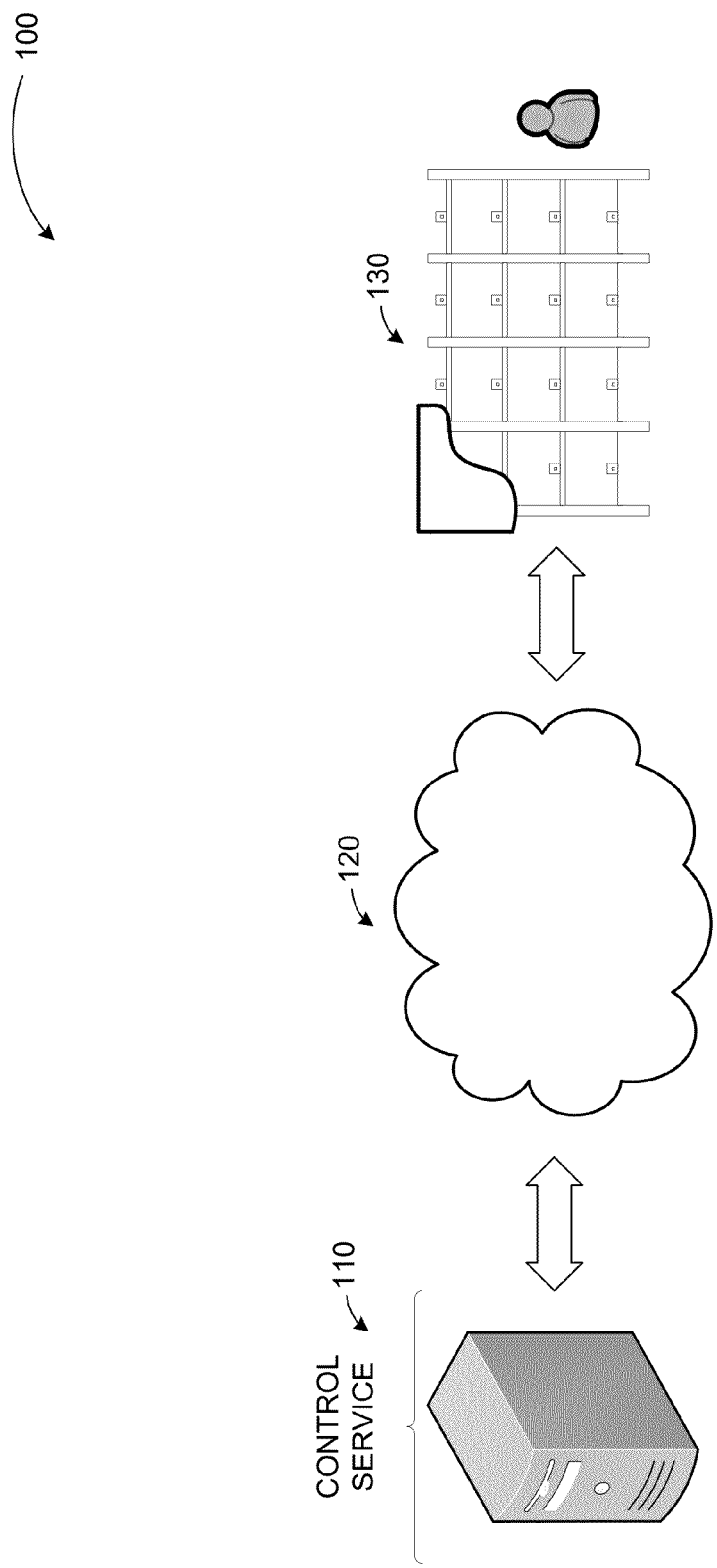
FIG. 1 is a diagram illustrating example components of a system providing infrastructural haptics on wall scale interactive displays.

As briefly described above, infrastructural haptics may be provided on wall scale interactive displays. An interactive wall may be enabled to detect a touch on a wall surface through sensors of the interactive wall. Upon detecting the touch, the interactive wall may provide real time tactile feedback corresponding to the detected touch. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a non-transitory computer readable memory device. The computer-readable storage medium can for example be implemented via one or more of a volatile computer memory, a non-volatile memory, a hard drive, a flash drive, a floppy disk, or a compact disk, and comparable physical storage media.

Throughout this specification, the term "platform" may be a combination of software and hardware components for providing infrastructural haptics on wall scale interactive displays. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Haptics is a technology to provide tactile user feedback to touch. Sensors on a surface may detect the touch by sensing pressure. Alternatively, optical or infrared detection based sensor technologies may also be implemented. A control device may receive the sensor input and instruct actuators to move the surface. The surface movement may be dependent on the location and the sequence of the touch. The actuators may move part of the surface. Alternatively, actuators may move the whole surface based on the control service's instructions.

Embodiments are not limited to haptics as described above. A surface with haptics capabilities may be utilized for display purposes. The tactile feedback may be shaped according to displayed content. An example may be a simulation of a scroll wheel. A haptics capable surface may provide the sensation of a clickable scroll wheel as a user swipes along the surface. The haptics capable surface may utilize vibrating actuators to move the surface. Alternatively, the haptics capable surface may utilize sound producing actuators to move the surface for tactile feedback while providing audio feedback.

Embodiments provide infrastructural haptics on wall scale interactive displays. Tactile feedback may enable walls to act as interactive media while serving as displays. A user may be enabled to touch an interactive wall and receive feedback from the interactive wall displaying a projected image. Alternatively, an interactive wall may provide tactile feedback to a user utilizing a display attached to the wall. While references are made to interactive walls providing tactile feedback through sensors and actuators throughout the Specification and Claims, embodiments are not limited to only vibration as a means to move the interactive wall. Tactile feedback through an interactive wall may be provided through other means applying the principles discussed herein.

FIG. 1 is a diagram illustrating example components of a system providing infrastructural haptics on wall scale interactive displays. In diagram 100, the server 110 may provide control services such as management of tactile feedbacks based on detected touch on an interactive wall. In an example scenario, a user or multiple users may be interacting with a display attached to or projected on an interactive wall 130. The interactive wall 130 may detect a user's touch through its sensors (e.g., pressure sensors). The interactive wall 130 may report the detected touch to the control service 110. The control service 110 may search and retrieve a corresponding tactile feedback to the touch from a data store containing sensory inputs and matching tactile feedbacks. The control service 110 may transmit the retrieved tactile feedback corresponding to the detected touch to the interactive wall 130. The interactive wall 130 may play the tactile feedback through its actuators (e.g., simulating a scroll wheel where the scroll bar is displayed).

Embodiments enable infrastructural haptics on wall scale interactive displays through control resources using a network 120. The network 120 may be a local network or may be an external entity such as an Internet based infrastructure. It may provide wired or wireless connectivity. Interactive wall 130 and the control service 110 may connect to each other through unsecured or secured connectivity. An example of a secured connectivity may be a Virtual Private Network (VPN) established among the interactive wall and the control service with the use of encrypted communications.

The server 110 may provide tactile feedback matching a detected touch on the interactive wall 130. The server may integrate sensory input with the displayed content to retrieve a matching tactile feedback. In an embodiment, the server 110 may provide the control service as a separate entity accessible through network 120. In an alternative embodiment, the control service 110 may be provided by an integrated circuit within the interactive wall. Yet in other embodiments, the control service may be on the display device for tight integration with the displayed content. Embodiments are not limited to client/server and peer-to-peer architectures. Providing infrastructural haptics on wall scale interactive displays may be accomplished using other architectures.

Figure 2:
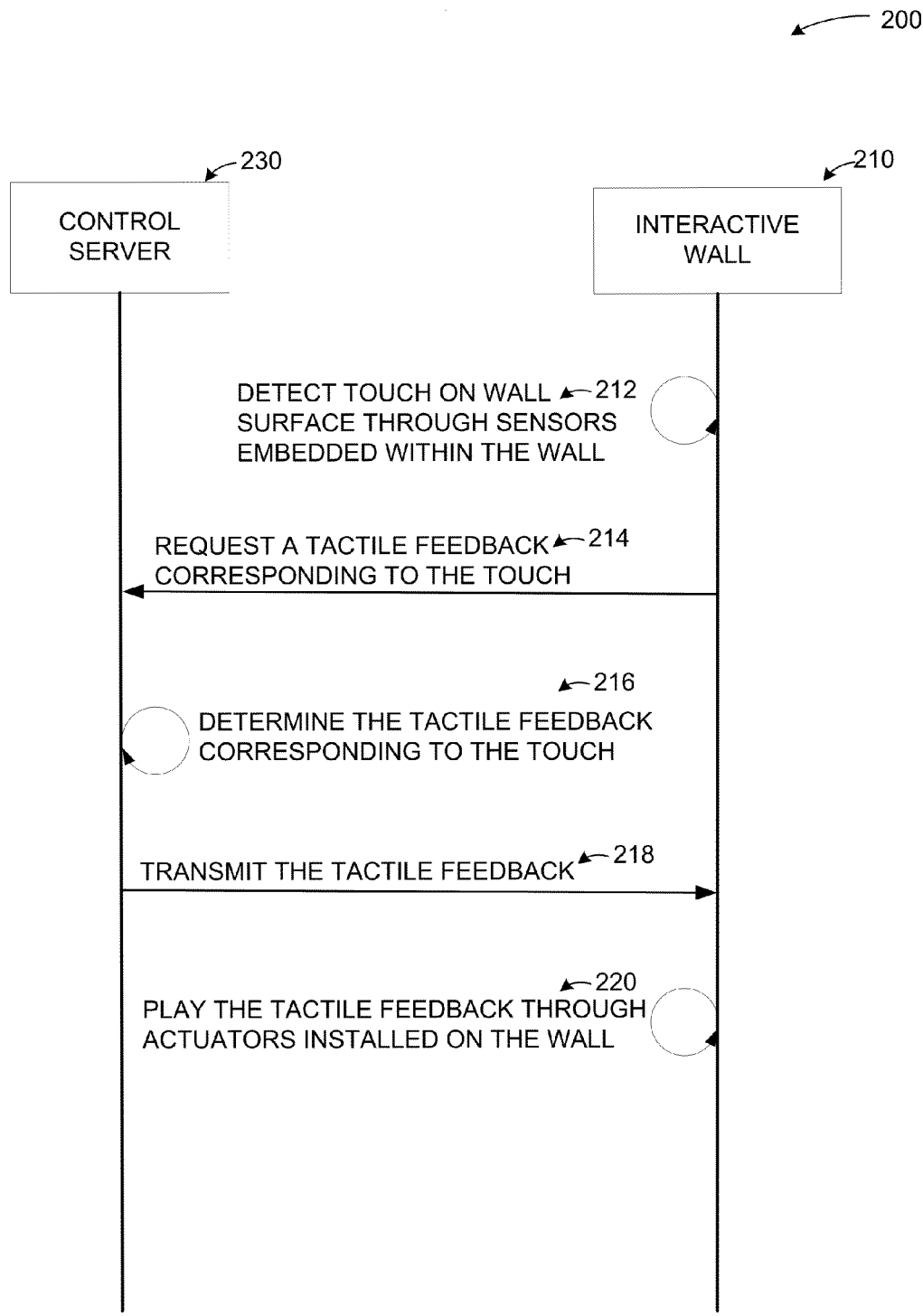
FIG. 2 illustrates an example action diagram of providing infrastructural haptics on wall scale interactive displays.

FIG. 2 illustrates an example action diagram of providing infrastructural haptics on wall scale interactive displays. Insertion of actuators into an interactive touch enabled wall surface (e.g., an interactive projection surface including a projector and touch sensors or a thin wall sized display) may be used to provide touch feedback to the user. When a key event including, but not limited to, clicks, button presses, dragging objects, etc. occurs, the actuator may provide immediate physical response to the user giving them a deeper level interaction with a physical/mechanical object.

Embodiments introduce a user interaction model that provides a realistic tactile sensation of manipulating physical objects, environments and controls. On-screen button shapes and topology may be felt through touch without having to rely on visual cues. The tactile, incremental indents of an on-screen scroll wheel can be simulated, providing more user control. Textures can be simulated for swipe and multi-touch gestures. On-screen buttons may provide a click-back sensation when pressed insuring a positive actuation. Navigation through virtual environments can be controlled using various levels of pressure on the screen.

In a networked implementation, interactive wall 210 may detect touch, provide tactile feedback by forwarding the detected touch to control server 230, and receive instructions for providing tactile feedback through actuators. The control server 230 may manage sensory feedback and display content integration and transmit a corresponding tactile feedback in order for the interactive wall to play the tactile feedback.

The interactive wall 210 may initiate real time tactile feedback to sensed touch by detecting a touch on wall surface through sensors embedded within the wall (212). Alternatively, the touch may be detected through optical sensors, infrared detection based sensors, or similar ones. The touch may be a single instance of detected pressure on the interactive wall surface. Alternatively, the touch may be sequence of pressures in a variety of locations detected on the interactive wall surface. After detecting the touch, the interactive wall 210 may request a tactile feedback corresponding to the touch (214) from the control server 230. The request may include the location(s), the sequence, and the level of pressure of the touch.

Next, the control server 230 may determine the tactile feedback corresponding to the touch (216). The control server 230 may analyze the parameters of the touch such as location, sequence, and level of pressure and integrate with displayed content. In an example, if the request matches single pressure in a sensory area corresponding to a displayed button, the control server may search for tactile feedback for a button press. The control server 230 may retrieve a tactile feedback matching the touch from a data store containing variety of touches and tactile feedbacks corresponding to the touches.

Upon retrieving a corresponding tactile feedback, the control server 230 may transmit the tactile feedback to the interactive wall (218). The interactive wall 210 may play the tactile feedback through actuators installed on the wall (220). The actuators may vibrate to move the interactive wall in order to simulate a tactile feedback. An example may be a swipe motion in which the actuators move the interactive wall to create contours along the length of the swipe to simulate a fluid wall. Alternatively, the actuators may move the wall continuously to maintain surfaces to duplicate the displayed content therefore giving a 3D shape to the interactive wall surface.

Additionally, it is important to manage any delays in the tactile feedback system. The tactile feedback may be played in real time within a time frame under a user's perception to detect delay. An example time frame may be under 0.1 seconds from detection of the touch to the play of the tactile feedback.

The described infrastructural haptics on wall scale interactive displays are for illustration purposes. Other tactile feedback systems on interactive walls may be used to provide tactile feedback to detected touch. Furthermore, feedback may be simulated by actuators moving the interactive wall through vibration, sound, etc.

Figure 3:
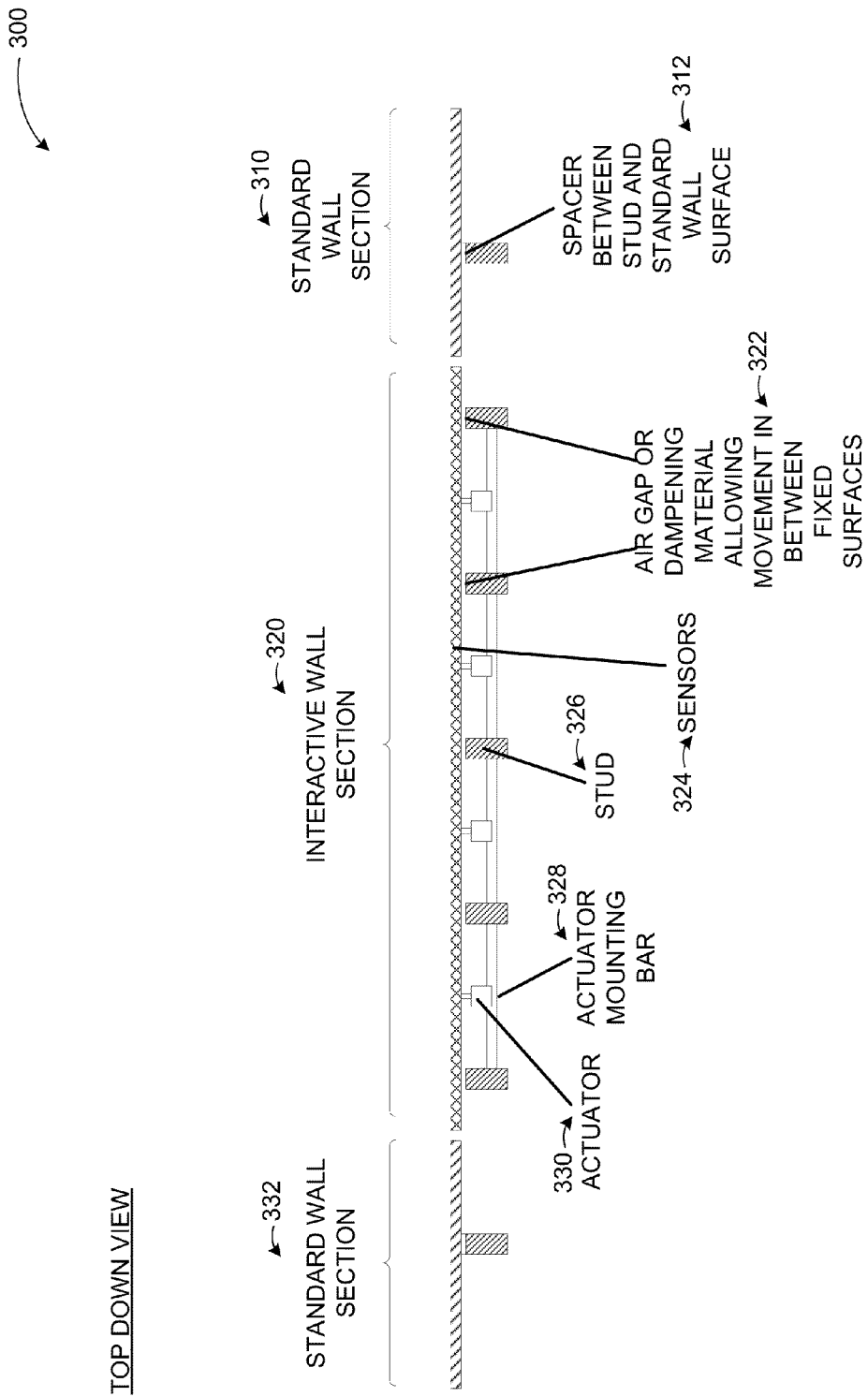
FIG. 3 illustrates a top view of the structure an example interactive wall providing infrastructural haptics for wall scale interactive displays according to some embodiments.

FIG. 3 illustrates an example providing infrastructural haptics on wall scale interactive displays according to some embodiments. Diagram 300 displays an example top down view of an interactive wall. In an embodiment, an interactive wall section 320 may be adjoined by standard wall sections 310, and 332. Each standard wall section may have a spacer between the wall stud and the standard wall surface 312 to dampen any movement coming from an actuator from the interactive wall section.

In another embodiment, an air gap or dampening material between wall stud and the interactive wall may allow movement in between fixed surfaces 322. Sensors 324 embedded within the interactive wall section may detect touch from user(s). An actuator 330 may play a tactile feedback corresponding to the touch to simulate hardware feedback. The actuator 330 may be mounted on an actuator mounting bar 328. Additionally, the mounting bar may be fixed to an interactive wall stud 326.

According to one embodiment, the sensors are embedded on the interactive wall surface registering the touch. In another embodiment, a display is projected to the interactive wall through a projector. Alternatively, the display may be overlaid on the interactive wall and utilize the display's sensors to provide sensory input to the interactive wall. The tactile feedback may be determined depending on a pressure level, a location, and a sequence of the touch.

The scenarios discussed above are provided as example embodiments. Other scenarios may be used to provide infrastructural haptics on wall scale interactive displays utilizing the principles discussed herein.

Figure 4:
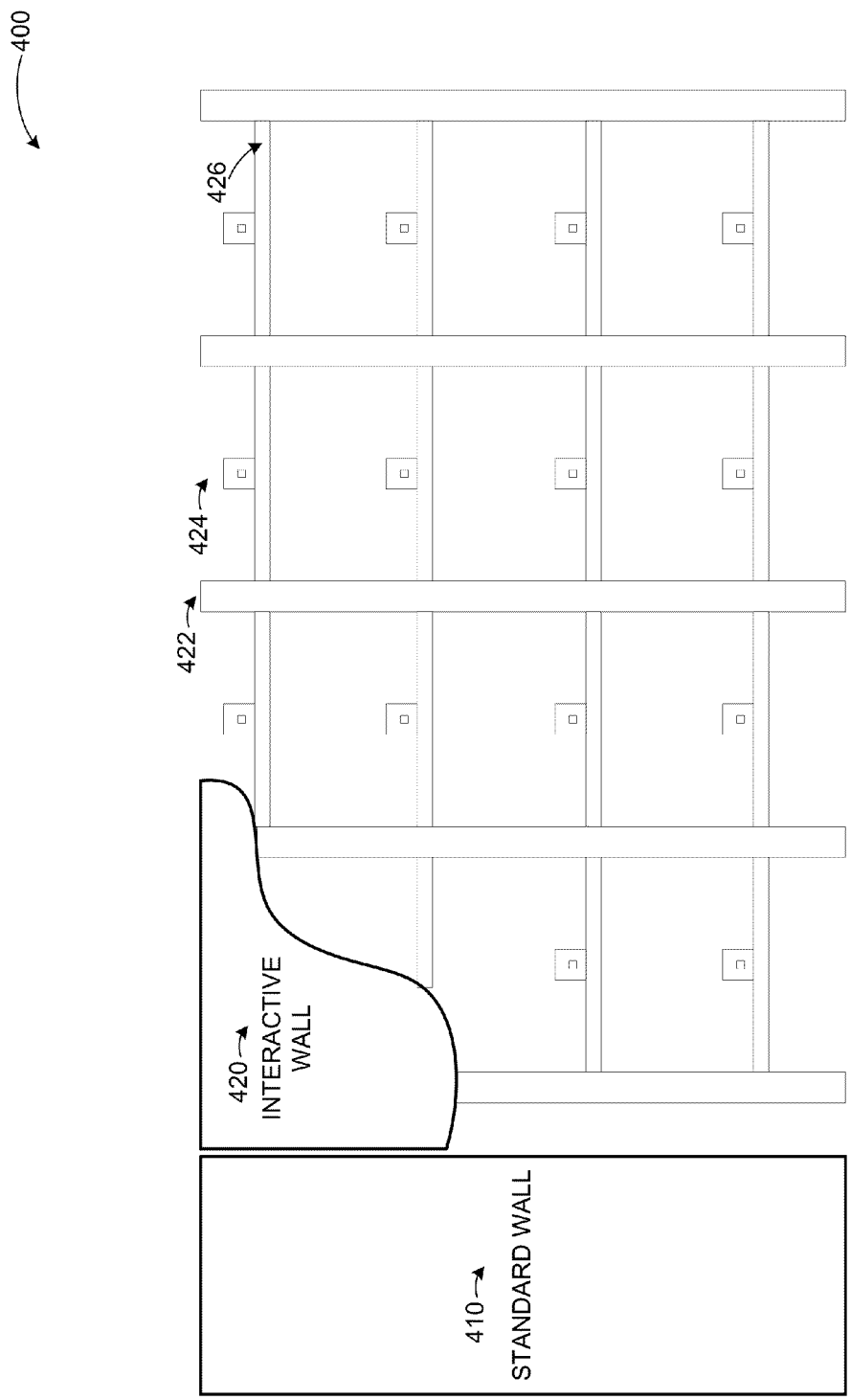
FIG. 4 displays a frontal view of the structure an example interactive wall providing infrastructural haptics for wall scale interactive displays according to some embodiments.

FIG. 4 displays another example providing infrastructural haptics on wall scale interactive displays. An example interactive wall may provide tactile feedback corresponding to a touch according to displayed content. In an embodiment, the tactile feedback may be played in real time to avoid delay in feedback response.

In some embodiments, diagram 400 may illustrate actuators installed as an array of actuators on an interactive wall 420 to provide tactile feedback play through a part or whole of the interactive wall. The interactive wall 420 may be adjacent to a standard wall 410. The interactive wall 420 may have studs that have fixed bars 426 holding the actuator 424. In an example, the actuators may be vibration generating devices installed on bars spanning across interactive wall studs.

In another embodiment, the actuators may be installed equidistance apart on a grid behind the interactive wall. In yet another embodiment, the actuators may be installed on studs of the interactive wall. In an example scenario, a damping agent or an air gap separates the actuators and the interactive wall to avoid vibration on the interactive wall studs while moving the interactive wall. In another example scenario, dampening agents separate the interactive wall with adjacent non-interactive walls.

In an example, the complexity of the tactile feedback may be dependent on a number of the actuators correlating a larger number of the actuators to a capability for an increased complexity of the tactile feedback. The interactive wall may be enabled to simulate a scroll wheel, buttons, clicks, swipes, multi-touch gestures, etc.

The systems and implementations of providing infrastructural haptics on wall scale interactive displays discussed above are for illustration purposes and do not constitute a limitation on embodiments. A touch dependent tactile feedback wall scale display may be implemented employing other modules, processes, and configurations using the principles discussed herein.

Figure 5:
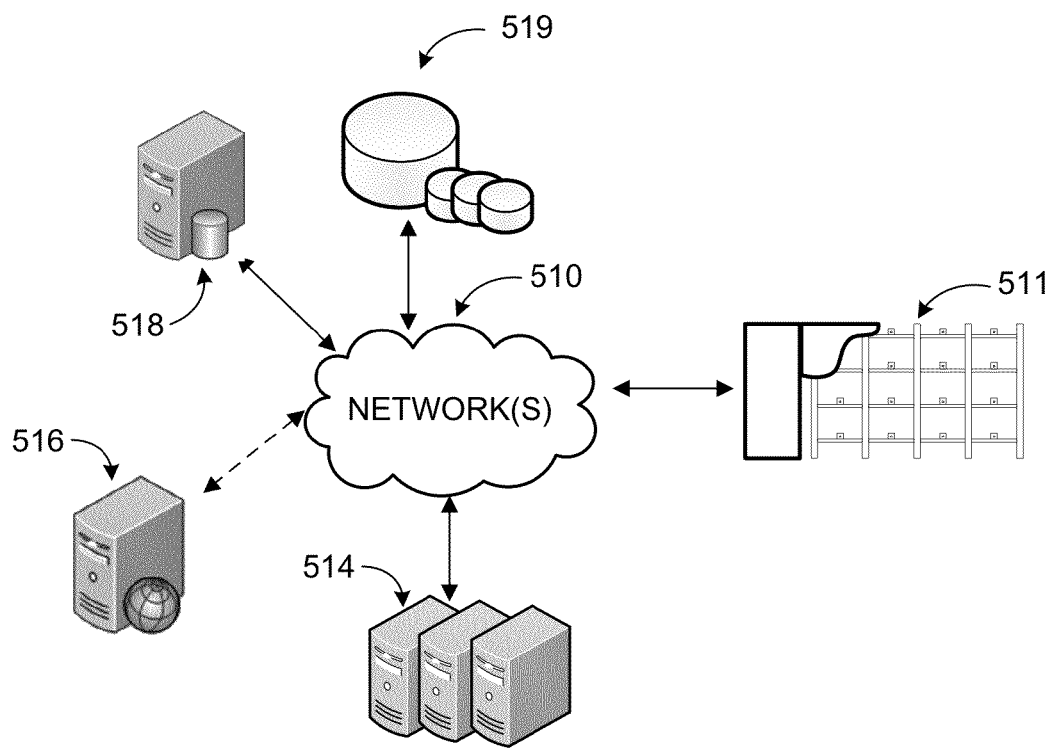
FIG. 5 is a networked environment, where a system according to embodiments may be implemented.

FIG. 5 is an example networked environment, where embodiments may be implemented. Tactile feedback control may be provided via software executed over one or more servers 514 or a single server (e.g. web server) 516 such as a hosted service. The platform controlling the tactile feedback may communicate with an interactive wall 511 through network(s) 510.

As discussed above, an interactive wall may provide tactile feedback depending on detected touch sensory input. Request for a tactile feedback may be transmitted from the interactive wall 511. After receiving the tactile feedback corresponding to the touch, the interactive wall may play the tactile feedback in real time. Time frame between detection of touch and play of the feedback may be under a user perception to detect a delay such as under 0.1 seconds.

Interactive wall 511 may access the control service executed on remote server(s) (e.g. one of servers 514) as discussed previously. The server(s) may retrieve or store relevant data from/to data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be provided for infrastructural haptics on wall scale interactive displays. Furthermore, the networked environments discussed in FIG. 5 are for illustration purposes only. Embodiments are not limited to the example applications, modules, or processes.

Figure 6:
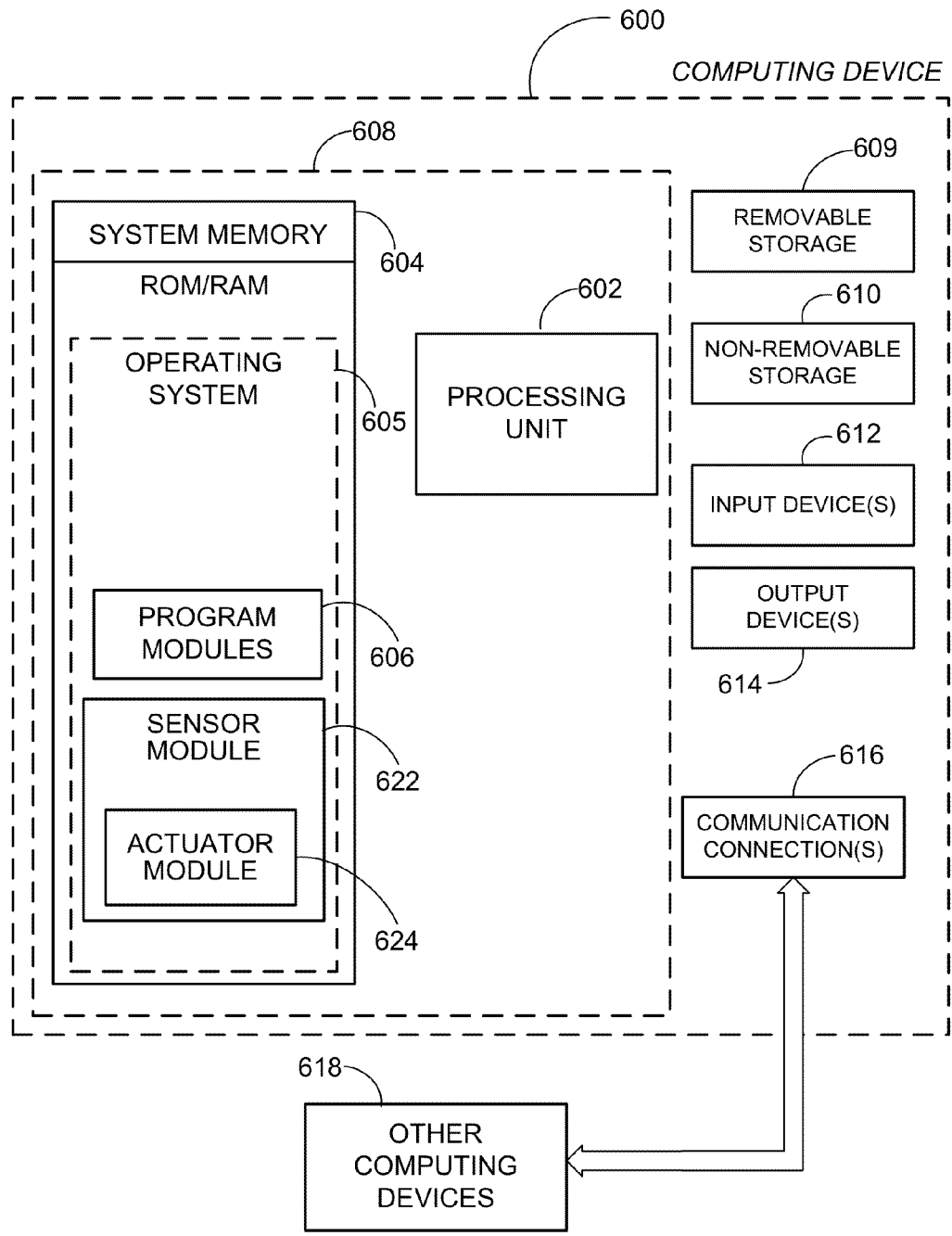
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, sensor module 622, and actuator module 624.

Sensor module 622 may be part of an interactive wall detecting sequence, location, and pressure level on the interactive wall surface. Actuator module 624 may play a tactile feedback on the interactive wall. The interactive wall may detect touch and play a corresponding tactile feedback according to the displayed contents. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. Computer readable storage media is a non-transitory computer readable memory device. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wireless network in a distributed computing environment, a satellite link, a cellular link, and comparable mechanisms. Other devices 618 may include computer device(s) that execute communication applications, storage servers, and comparable devices. Communication connection(s) 616 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 7:
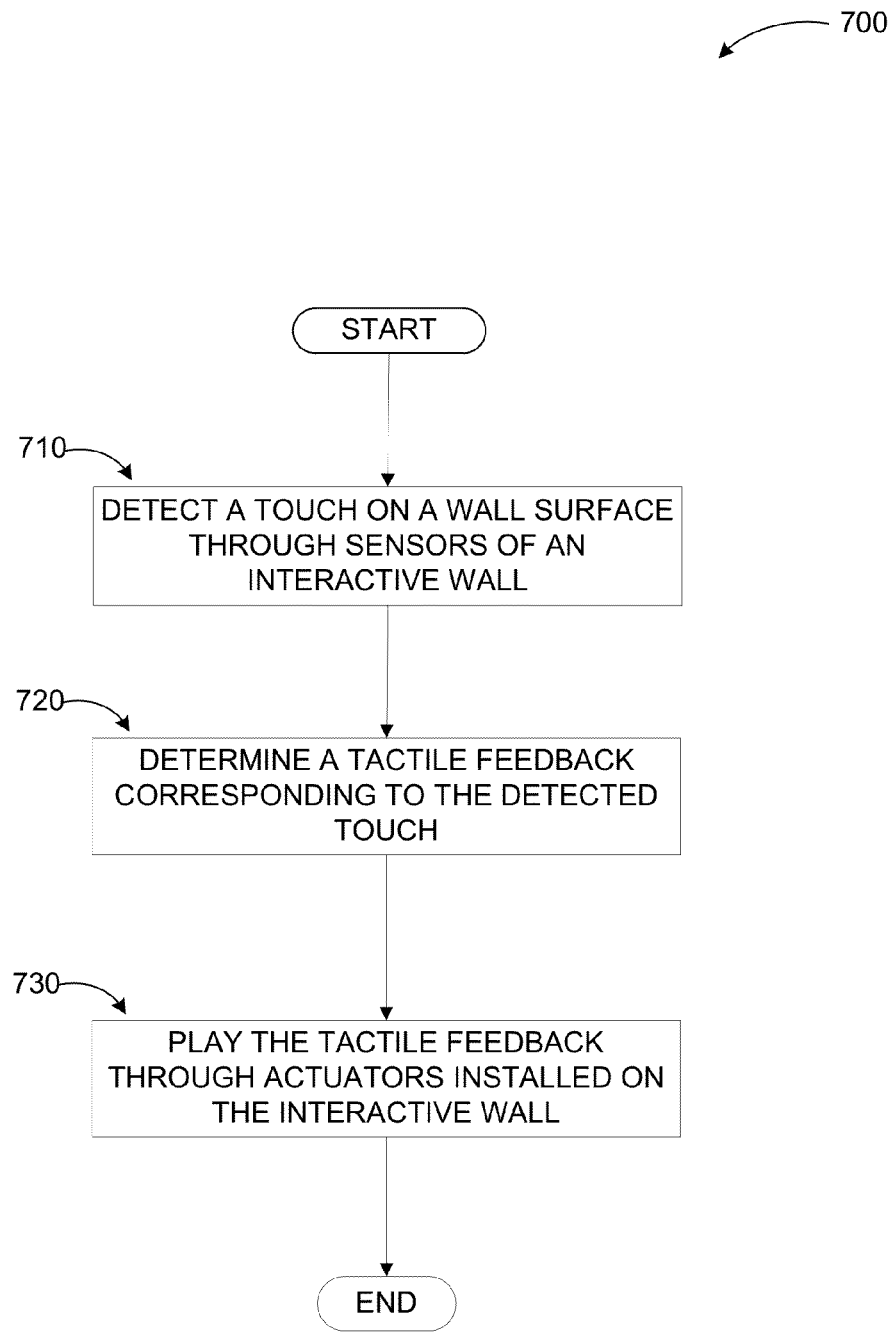
FIG. 7 illustrates a logic flow diagram for a process of providing infrastructural haptics on wall scale interactive displays according to embodiments.

FIG. 7 illustrates a logic flow diagram for a process providing infrastructural haptics on wall scale interactive displays according to embodiments. Process 700 may be implemented by an interactive wall, or similar system enabling haptics on wall scale displays.

Process 700 may begin by detecting a touch on a wall surface through sensors of an interactive wall at operation 710. At operation 720, one or more tactile feedbacks corresponding to the detected touch may be determined. This may be accomplished, for example, by retrieving the corresponding tactile feedbacks from a look-up table, employing a database query, employing a dynamic algorithm, and comparable methods. At operation 730, the interactive wall may play the tactile feedback through actuators installed on the interactive wall (e.g., array of actuators installed in an equidistant grid pattern on bars fixed to the interactive wall studs).

Some embodiments may be implemented in a computing device that includes a communication module, a memory, and a processor, where the processor executes a method as described above or comparable ones in conjunction with instructions stored in the memory. Other embodiments may be implemented as a computer readable storage medium with instructions stored thereon for executing a method as described above or similar ones.

The operations included in process 700 are for illustration purposes. Infrastructural haptics on wall scale interactive displays according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part by a computing device providing infrastructural haptics on wall scale interactive displays, the method comprising:
    displaying a user interface with touch-based control elements on an interactive wall display;
    detecting a touch on a surface of the interactive wall display affixed to a wall structure through sensors of the interactive wall display;
    reporting the detected touch to a control server provided by one of: an integrated circuit within the interactive wall display, and a local network;
    determining a tactile feedback corresponding to the touch at the control server;

retrieving the tactile feedback corresponding to the touch from a data store including a plurality of sensory inputs and matching tactile feedbacks; and playing the tactile feedback through actuators integrated to the interactive wall display, wherein the actuators are installed in an equidistant grid pattern on bars fixed to studs of the wall structure and the actuators simulate one of: a swipe motion, a button press, and a continuous three-dimensional shape of a surface of the interactive wall display.

2. The method of claim 1, wherein the tactile feedback is determined at a remote computing device, and the method further comprises:

transmitting information associated with the detected touch to the remote computing device; and receiving information associated with the tactile feedback from the remote computing device.

3. The method of claim 1, wherein the interactive wall display is a projection on the wall structure.

4. The method of claim 3, wherein the sensors and the actuators are embedded into the wall structure.

5. The method of claim 1, wherein the interactive wall display is a physical display device affixed to the wall structure.

6. The method of claim 5, wherein the actuators are embedded into the wall structure and the sensors are embedded into the display device.

7. The method of claim 1, further comprising:
determining the tactile feedback employing one of: a lookup table, a database query, and a dynamic algorithm.

8. The method of claim 1, further comprising:
playing back the tactile feedback in real time.

9. The method of claim 1, further comprising:
detecting a series of touches on the surface of the interactive wall display.

10. The method of claim 9, wherein the tactile feedback is dependent on at least one from a set of: a pressure level, a location, and a number, and a sequence of the detected touches.

11. The method of claim 1, wherein the tactile feedback is determined at a processor integrated into the interactive wall display.

12. A computing device capable of providing infrastructural haptics on wall scale interactive displays, the computing device comprising:

a memory;

a processor coupled to the memory, the processor executing an application in conjunction with instructions stored in the memory, wherein the application is configured to:

display a user interface with touch-based control elements on an interactive display;

receive at a sensor module integrated with the interactive display information associated with one or more touches detected on a surface of the interactive display affixed to a wall structure through sensors of the interactive display;

determine one or more tactile feedbacks corresponding to the one or more touches at a control server provided by one of: an integrated circuit within the interactive wall, a local network, and a remote network; and transmit information associated with playing the one or more tactile feedbacks corresponding to the one or more touches to an actuator module integrated with the interactive display, the actuator module configured to play the one or more tactile feedbacks through actuators integrated with at least a part of the interactive display, wherein the actuators are installed in an equidistant grid pattern on bars fixed to studs of the wall structure and the one or more tactile feedbacks are played less than 0.1 seconds after the one or more detected touches.

13. The computing device of claim 12, wherein the interactive display includes a physical display embedded with sensors.

14. The computing device of claim 12, wherein the wall structure further includes one of an air gap and a dampening agent to enable movement of the interactive display surface and avoid vibrational noises from contact between the wall structure and its surroundings.

15. The computing device of claim 12, wherein the interactive display simulates:

an on-screen scroll-wheel through incremental, tactile indents;

swipes and multi-touch gestures through tactile textures; and on-screen buttons through tactile click-back sensations.

16. The computing device of claim 12, wherein the interactive display enables navigation through virtual environments employing distinct levels of pressure on the surface of the interactive display.

17. A method for providing infrastructural haptics on wall scale interactive displays, the method comprising:

displaying a user interface with touch-based control elements on an interactive wall display;

receiving information associated with one or more touches detected on a surface of a display affixed to a wall structure through sensors embedded into the display, the display and the wall structure together forming the interactive wall display;

determining one or more tactile feedbacks corresponding to the one or more touches at a control server employing a dynamic algorithm to retrieve the one or more tactile feedbacks corresponding to the one or more touches from a data store including a plurality of sensory inputs and matching tactile feedbacks, wherein the control server is executed at one of: an integrated circuit within the interactive wall, a local network, and a remote network; and transmitting information associated with playing the one or more tactile feedbacks through actuators integrated to the wall structure of the interactive wall display, wherein the actuators are installed in an equidistant grid pattern on bars fixed to studs of the wall structure.

18. The method of claim 17, further comprising:
determining the tactile feedbacks based on at least one from a set of: a pressure level, a location, and a number, and a sequence of the detected touches from one of: embedded pressure sensors, optical sensors, and infrared detection based sensors.

19. The method of claim 17, wherein the actuators are vibration generating devices installed on bars spanning across the wall structure of the interactive wall display.

* * * * *